United States Patent [19]

Peters

[11] 4,098,262

[45] Jul. 4, 1978

[54] HEATING APPARATUS USING SOLAR ENERGY

[75] Inventor: Melville F. Peters, Livingston, N.J.

[73] Assignees: Walter Todd Peters; Margot Elizabeth Peters, both of East Dennis, Mass.; Albert F. Kronman, Locust Valley, N.Y.

[21] Appl. No.: 617,041

[22] Filed: Sep. 26, 1975

[51] Int. Cl.² .................................................. F24J 3/02
[52] U.S. Cl. ..................................... 126/270; 237/1 A
[58] Field of Search ................ 126/270, 271; 237/1 A

[56] References Cited

U.S. PATENT DOCUMENTS

| 1,673,429 | 6/1928 | Vinson | 126/271 |
| 2,383,234 | 8/1945 | Barnes | 126/271 X |
| 2,529,621 | 11/1950 | Mayo | 126/270 |
| 2,680,437 | 6/1954 | Miller | 126/270 |
| 2,907,318 | 10/1959 | Awot | 126/271 |
| 3,076,450 | 2/1963 | Gough et al. | 126/271 |
| 3,190,816 | 6/1965 | Adamec | 126/271 X |
| 3,250,269 | 5/1966 | Sherock | 126/271 |
| 3,412,728 | 11/1968 | Thomason | 126/270 |

*Primary Examiner*—Kenneth W. Sprague
*Attorney, Agent, or Firm*—Albert F. Kronman

[57] ABSTRACT

A solar energy absorbing panel having two or more conduits for the passage of a gas therethrough, in which the said gas is shielded from the cooling effect of the ambient temperature. Control means are provided to use the warmed gas for heating a structure.

3 Claims, 7 Drawing Figures

HEATING APPARATUS USING SOLAR ENERGY

BACKGROUND OF THE INVENTION

Absorbers for converting the sun's radiant energy into heat which is then transferred to liquids and employed for useful purposes are old in the art. Such apparatus, however, include a number of objectionable features. First, the cost of installation is quite high and second, these systems are heavy and complicated. Where the working substance is air or a gas, the air is circulated across the surface absorbing the radiant energy from the sun in an enclosure having glass or plastic windows to take advantage of the so called "greenhouse effect". On a cold day, a very substantial amount of heat may be lost by such structures through the windows as a result of contact of the air with the said glass or plastic surfaces. The air passing through the absorber on a cold sunny day may thus actually undergo a drop in temperature. The conventional way of reducing this heat loss is to use double or triple windows having air spaces therebetween. Such installations are expensive to install, expensive to keep clean, and have double or triple the energy loses due to absorption of the sun's rays by the glass.

A feature of the present invention is its means for heating a circulating stream of air or gas without bringing it into contact with ambient temperatures.

A further feature of the present invention is to employ a combination of a sheet material having corrugated surfaces to form the wall of the absorber conduit facing the energy source and a sheet having flat surfaces to form the opposite wall.

Another feature of the invention includes the use of a baffle to prevent warm air from contacting surfaces cooled by ambient air.

A feature of the invention is to use reinforced or roofing material for the absorbing units.

Additional details of the invention will be disclosed in the following description, taken in connection with the accompanying drawings, in which drawings, similar elements have been given identical reference numerals.

DESCRIPTION OF THE PREFERRED EMBODIMENT

Figure 1:
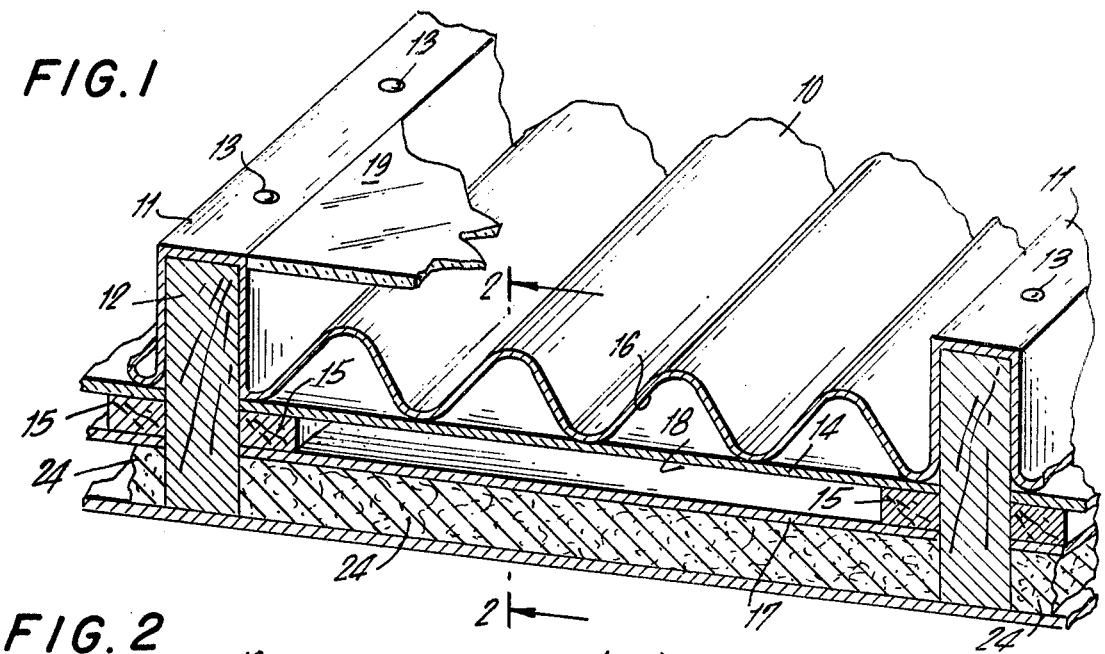
FIG. 1 is a fragmentary diagramatic view, partly in section, of the absorbing device made according to the present invention. This view is taken along line 1—1 of FIG. 2.
Figure 2:
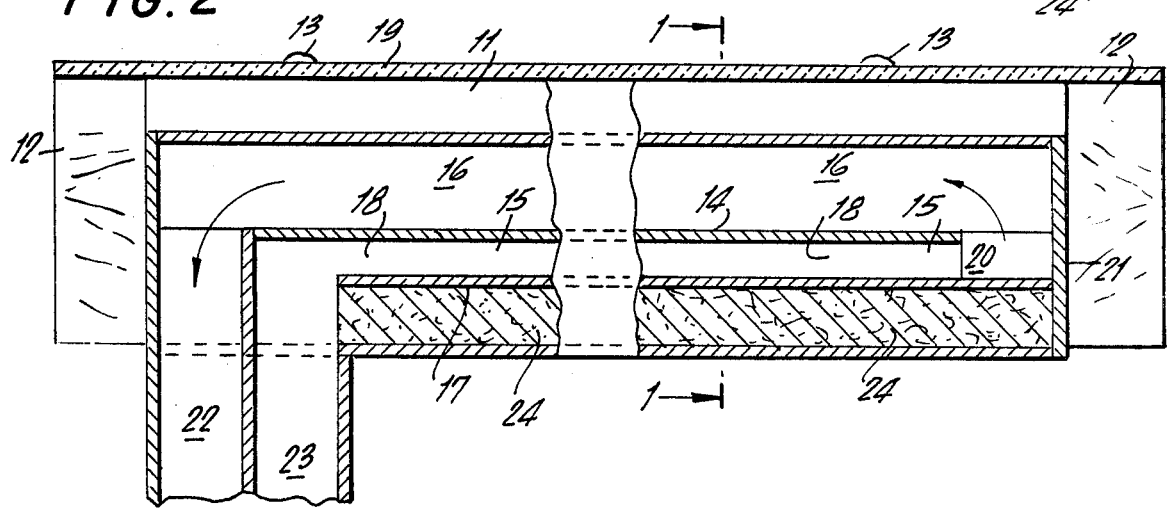
FIG. 2 is a cross sectional view of the device shown in FIG. 1 and is taken along line 2—2 of that figure.

Referring to FIGS. 1 and 2, the energy absorbing device comprises a corrugated sheet 10 made of material such as blackened metal, asphalt impregnated paper or felt or the like. Each sheet is made with opposed side channels 11 which fit over roof rafters 12 and may be secured to them by nails 13. The corrugated portions of the sheet 10 rest on a second sheet 14 which may be flat and supported at its edges by wooden strips 15. The combination of sheets 10 and 14 form a series of parallel conduits 16. Air or gas in these conduits is in contact with a very large wall area exposed to the solar radiation. The upper surfaces of sheet 10 is preferably painted with a flat black paint in order to absorb the sun's radiation in an efficient manner.

The second series of conduits is formed by nailing a rigid sheet 17 to the bottom surfaces of strips 15 thereby providing a broad cavity 18 which is used as a return flow means and as a heat buffer to protect the conduits 16. Conduits 16 and 18 may be joined at one end by a construction indicated in FIG. 2. Here the wooden strip 15 is cut away and the sheet 14 is cut back so as to leave a turn-around space or elbow 20 covered by a wall 21. At the other end, conduits 16 are joined by a vertical passage-way 22 through which the hot air may be removed by a suitable fan. Conduit 18 is also joined to a similar vertical passage-way 23 through which cold air is pumped to the solar device for heating.

During the operation of the absorber, the sun's rays pass through the glass or plastic cover 19 and strike the top surface of the corrugated sheet 10. The heat is absorbed by the corrugated sheet aided by the black surface. Air, forced through channels 16, is heated by contact with the sheet 10 and then is pumped to other areas where the heat is utilized. The rigid sheet 17 is covered by an insulator 24 to prevent heat flow to unwanted spaces.

Figures 3, 4:
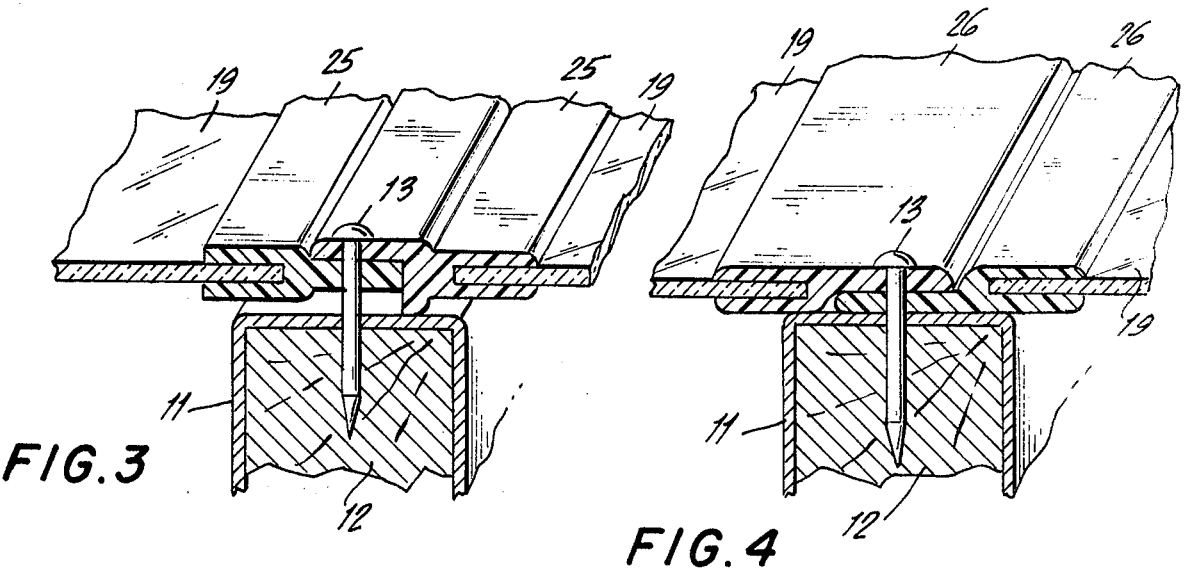
FIG. 3 is a partial cross sectional view of a means for fastening sheets of transparent material to a series of roof rafters.
FIG. 4 is a view, similar to FIG. 3 but using a different combination of fastening units.

FIG. 1 shows the protective cover 19 for the absorber as a sheet of transparent material such as glass or plastic. In some cases it may be necessary to replace the transparent sheet above the absorber due to breakage, deterioration, etc. Convenient nailing strips for this purpose are shown in FIGS. 3 and 4 where a series of transparent sheets 19 are supported by plastic strips 25 or 26. Each strip includes a supporting section containing a slot for holding the edge of the sheet 19 and a nailing section arranged for nailing or screwing the strip to the top of the rafter 12. FIG. 3 shows the preferred type where one frame is joined to the other by a tongue and groove connection. FIG. 4 shows an alternate form where the two frames overlap each other. The transparent sheets 19 may be made of glass or plastic as long as the sheets pass the infrared rays, (ranging in wavelength from the visible to at least eight microns).

Figure 5:
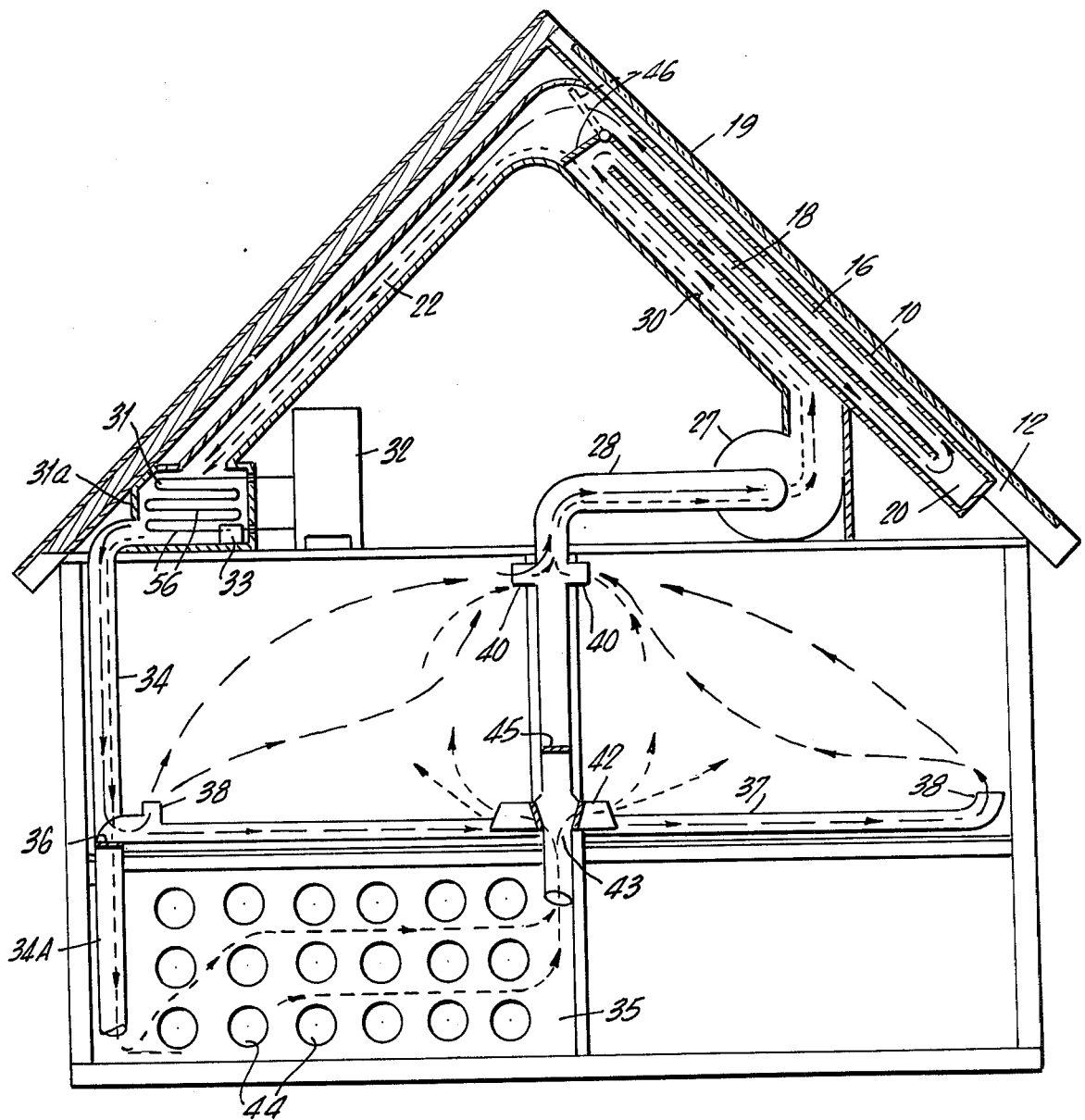
FIG. 5 is an end view, partly diagramatic, with some parts in section showing a complete installation of the solar unit, including a heat storage device.

FIG. 5 shows the absorber unit applied to one side of a roof of a house with some operating features added. The absorber is connected to a pump 27, run by any convenient power means, which forces air from an input conduit 28 through a distribution channel 30 where it is separated and directed to all the sections of the absorber unit. FIG. 5 shows one portion diverted to the conduit 18, then through elbow 20 to conduit 16 and finally to the output conduit 22. The end of output conduit 22 is connected to a heat exchanger 31 where the hot air is forced past a plurality of water pipes 56 connected to a hot water reservoir 32 and a hot water distribution system (not shown). Water in the hot water pipes is held stationary until the temperature of the water reaches a predetermined value, then a valve 33, connected in series with the pipes, is opened and the hot water from the heat exchanger is sent to the hot water reservoir and system by suitable valving, well-known in the art.

The output end of the heat exchanger housing 31A is connected to a vertical conduit 34 which can be used to deliver hot air to a heat storage means 35 in the basement of the house. A "T" joint with a two-way valve 36, is available for diverting the flow of hot air into a horizontal conduit 37 connecting with openings in all the rooms on the first floor of the house and forming the main house heating element. FIG. 5 shows floor discharge ports 38 in two rooms for delivering hot air. Air from the rooms is collected by elevated ports 40 connectd to input conduit 28 and fan 27. The ports 40 are also connected to a vertical conduit 41 which connects with the heat storage means 35 and includes warm air discharge ports 42 plus a flap valve 43 for each room. The heat storage means 35 may contain a large volume of water in pipes 44 or other containers. It may also be filled with dry rocks of a type having a high specific heat.

The above system may be operated in at least three modes. First, in coldweather when the sun is shining, and the house, together with the hot water supply, is to be heated, flap valves 43 are closed, in the position shown in FIG. 5. Valves 36 and 45 are closed, blocking the vertical flow of air in conduits 34A and 41. The path of the air may then be traced from the fan 27 through conduits 16, 18, 22, 30 through the heat exchanger 31, conduits 34 and 37 to the discharge ports 38 in each room. After passing through the room space where the hot air mixes with the cold room air, it is then drawn through elevated ports 40 in conduit 28 and sent back to fan 27. The general direction of the air in this first mode is shown in the dashed directional lines. Valve 46 above conduit 30 is closed during this operation as shown in FIG. 5, forcing the air stream into all the conduits in the absorber device.

The second mode of operation includes the storage of heat energy when the sun is shining but the house is not in need of heat. Valve 46 remains in its closed position, sending all the air through the solar absorber. Valve 36 is swung up, sending all the air through the lower extension 34A of conduit 34. And, valve 45 is opened so that all the air in conduit 41 is drawn through the fan 27. This action sends all the heated air through the storage space 35 storing heat in the storage means 35.

The third mode of operation occurs when the sun has set, or is not shining, and the house is in need of heat. In this mode, valve 46 is swung to the position shown in dashed lines in FIG. 5, eliminating the heat absorber from the air flow circuit. Valves 36 and 45 are operated to open the entrance and exit conduits of the storage means 35. Valves 43 remain closed and valve 36, when operated, closes conduit 37 and eliminates all flow of air in this conduit. The flow of air may now be followed by observing the dotted direction lines in FIG. 5. From the fan 27 the air moves through conduits 30 and 22, through heat exchanger 31, conduits 34 and 34A, into the heat storage means 35 where the circulating air is heated by the hot rocks or hot water. From the storage means 35 the hot air is drawn through the lower end of conduit 41, then out into the rooms through discharge ports 42 and open valves 43. The hot air mixes with the room air and the cooler mixture is then drawn into elevated ports 40, and then to pump 27 to complete the cycle. The lengths of ports 40 may be extended into the rooms to produce better mixing action.

Figure 6:
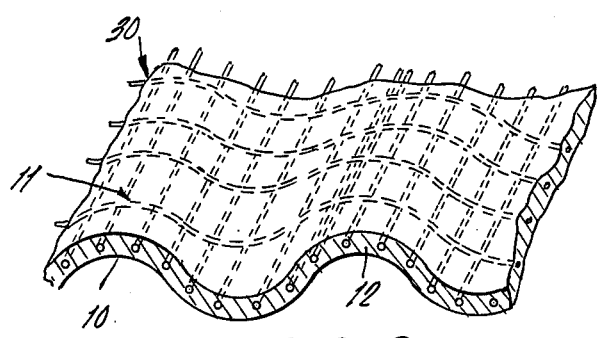
FIGS. 6 and 7 show alternate forms of energy absorbing structures.
Figure 7:
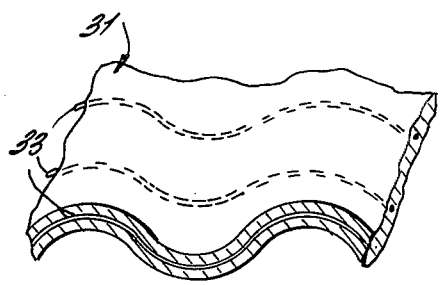

The energy absorbing structures 30 shown in FIGS. 6 and 7 are formed 30A of roofing material such as asphalt impregnated paper or felt 31 or other fluid tight material which is corrugated to provide the conduits necessary for the practice of the present invention. In order to maintain the shape of these structures in the presence of high solar temperatures it is necessary to support therm economically. In FIG. 6 the absorber 30 is supported by a thin wire mesh 32 incorporated into the paper 31. In FIG. 7 spaced wires 36 embedded in the absorber 30A serve to maintain its corrugated shape.

From the above description it is evident that this system provides efficient heating action using only air as the transfer medium, thereby increasing the efficiency of the transfer action and reducing the cost of the equipment.

I claim:

1. Apparatus for converting solar rays into usable heat energy comprising: a sheet of infrared ray transmitting material, an infrared energy absorbing sheet spaced from the said transmitting material, lateral support means for the transmitting material and absorbing sheet enclosing the volume therebetween, a second sheet spaced from the energy absorbing sheet to form at least a first gas conduit therebetween, a rigid third sheet spaced from the second sheet to form a cavity below the second sheet, an output conduit to receive heated gas from the first conduit, an elongated passageway connected at one end to the cavity and in communication with the gas coming from the output conduit, and means for circulating the gas through the conduits, passageway, and cavity beneath the energy absorbing sheet.

2. Apparatus according to claim 1 in which the gas circulating means includes a pump and at least one valve disposed in the path of gas flow.

3. Apparatus according to claim 1 including valve means to selectively close and open the said conduits and cavity.

* * * * *